C. W. McLEAN.
MILK COOLER.
APPLICATION FILED MAR. 1, 1919.

1,398,787.

Patented Nov. 29, 1921.

WITNESSES

INVENTOR
C. W. McLean
BY
ATTORNEYS

UNITED STATES PATENT OFFICE.

CHARLES W. McLEAN, OF SHAVERTOWN, NEW YORK.

MILK-COOLER.

1,398,787. Specification of Letters Patent. Patented Nov. 29, 1921.

Application filed March 1, 1919. Serial No. 279,963.

*To all whom it may concern:*

Be it known that I, CHARLES W. McLEAN, a citizen of the United States, and a resident of Shavertown, in the county of Delaware and State of New York, have invented certain new and useful Improvements in Milk-Coolers, of which the following is a specification.

My present invention relates generally to liquid cooling devices and more particularly to milk coolers, my object being the provision of a simple, inexpensive device capable of use in filtering milk into milk cans, to cool the milk as it is discharged into the can.

A further object is the provision of a device of this nature capable of ready and quick connection with, and disconnection from, a milk can.

Further objects and the resulting advantages of my present invention will be better understood from the following description thereof, referring to the accompanying drawing, in which:—

Figure 1:
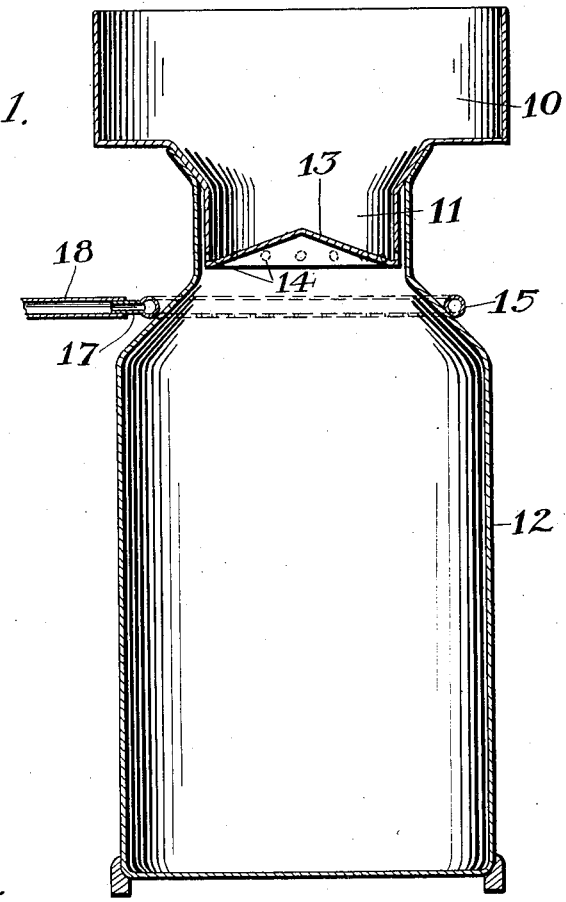
Figure 2:
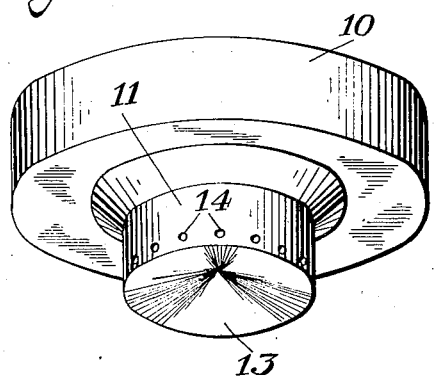
Figure 3:
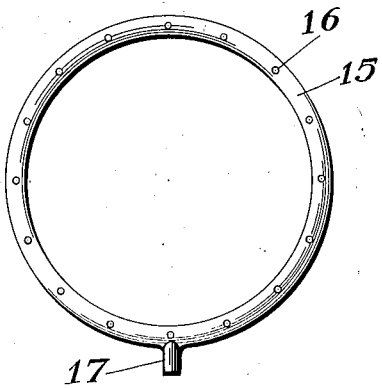

Figure 1 is a vertical section through a milk can to which my invention has been applied, Fig. 2 is a detail perspective view of my invention removed, and Fig. 3 is a detail plan view of the means supplying the cooling medium.

Refering now to these figures, my invention resides in a container which is preferably of the cylindrical form shown at 10 in Fig. 1, open at its upper end so that milk or other fluid to be cooled, may be readily poured within the same, the container so formed having a central depending cylindrical portion 11 whose diameter is preferably such as to permit of its ready telescoping movement downwardly into the upper open mouth of a milk can, as seen at 12 in Fig. 1.

According to my invention, the depending portion 11 is entirely open to the interior of the container 10 and terminates at its lower end in a conical base 13, which serves to throw the milk outwardly by the pressure within the container, against the cylindrical walls of the portion 11.

For the discharge of the milk into the milk can 12, the cylindrical wall of the depending portion 11 of the container 10 is provided with an annular series of openings 14 disposed therearound immediately above the lower outer edge of the base 13, so that the milk so discharged, is sprayed by the openings 14, against the inner surface of the upper neck portion of the milk can 12 with sufficient force to cause the milk to adhere to the inner surface of the milk can and flow downwardly therein in the form of a film against the inner surface of the can, the film following the general shape of the can and gradually spreading out where the can enlarges between the upper neck portion and its body.

In this way warm milk will be cooled by virtue of its close intimate contact with the comparatively cool wall of the milk can, although this result may be magnified by the use of any suitable means for chilling the wall of the can, such means as for instance shown in Figs. 1 and 3, consisting of a tubular ring 15 having discharge openings 16 at the base point therearound, and having a nipple 17 to which a hose 18 may be connected for preparing the ring with a chilling fluid, as for instance cold water. As the milk is discharged into the can, the supply of water through the cooling ring 15 is maintained and thus the wall of the can 12 will transmit a maximum cooling effect to the film of milk traveling downwardly upon its inner surface due to the construction previously described.

It is obvious that my improved cooling device may be quickly inserted in and removed from a milk can, and may be utilized with a filtering material within the casing 10 and across the upper open end of the depending cylindrical portion 11, if so desired, so as to filter the milk previously discharged into the milk can. It is obvious, however, that this is not necessary to the working of my invention. It is also to be understood that the conical base 13, as well as that portion of the depending cylinder 11 which carries the openings 14, may be made removable if so desired, the cylindrical portion 11 being then in two parts. This also is not necessary, however, to the working of the invention as previously described.

I claim:

The combination of a milk receptacle and a pouring guide in the nature of a funnel having a portion thereof depending into the receptacle and provided with a conical base and an annular series of discharge openings in its wall above the base, the depending portion being of slightly reduced diameter with respect to that of the receptacle, whereby to position its wall immediately adjacent to the inner surface of the receptacle and thus discharge milk from its wall openings against the inner wall of the receptacle.

CHARLES W. McLEAN.

Witnesses:
 CHARLES B. JOHNSON,
 ANDREW T. GIBBS.